United States Patent [19]

Kusumoto et al.

[11] Patent Number: 5,576,584

[45] Date of Patent: Nov. 19, 1996

[54] STATOR OF A VEHICULAR ALTERNATING CURRENT GENERATOR AND ITS MANUFACTURING METHOD

[75] Inventors: Katsuhiko Kusumoto; Hiroki Katayama; Katsumi Adachi, all of Himeji, Japan

[73] Assignee: Mitsubishi Denki Kabushiki Kaisha, Tokyo, Japan

[21] Appl. No.: 273,707

[22] Filed: Jul. 12, 1994

[30] Foreign Application Priority Data

Mar. 16, 1994 [JP] Japan ..................... 6-045759

[51] Int. Cl.$^6$ ............................ H02K 15/12; H01F 27/32
[52] U.S. Cl. ................... 310/45; 310/51; 336/205
[58] Field of Search ............................ 310/43, 51, 45, 310/179, 194; 336/205, 206, 219

[56] References Cited

U.S. PATENT DOCUMENTS

| | | | |
|---|---|---|---|
| 3,634,164 | 8/1969 | Van Hirtum | 156/159 |
| 4,012,653 | 3/1977 | Shigeta et al. | 310/217 |
| 5,209,873 | 5/1993 | Yamamoto et al. | 252/512 |

FOREIGN PATENT DOCUMENTS

| | | |
|---|---|---|
| 6-023904 | 2/1994 | Japan . |
| 6-23904 | 4/1994 | Japan . |

*Primary Examiner*—Steven L. Stephan
*Assistant Examiner*—Judson H. Jones
*Attorney, Agent, or Firm*—Sughrue, Mion, Zinn, Macpeak & Seas

[57] ABSTRACT

A stator of a vehicular alternating current generator comprising: a stator core having slots; and a stator coil wound in the slots of the stator core; wherein a resin having a peak or peaks of a loss tangent which is a value of a loss elastic modulus divided by a storage elastic modulus in a temperature range of from 100° C. to 250° C. is provided among coil strands of the stator coil and/or between the stator core and the stator coil.

5 Claims, 6 Drawing Sheets

M1: Mass of stator core
M2: Mass of stator coil
K1: Elasticity of stator core
K2: Elasticity of viscoelastic member
C1: Viscosity of stator core
C2: Viscosity of viscoelastic member
F1: Electromagnetic force acting btw. stator and rotor
F2: Electromagnetic force generated in stator coil

STATOR OF A VEHICULAR ALTERNATING CURRENT GENERATOR AND ITS MANUFACTURING METHOD

BACKGROUND OF THE INVENTION

1. Field of the Invention

This invention relates to reducing a magnetic noise of a vehicular alternating current generator.

2. Discussion of Background

FIG. 7 is a sectional diagram in the axial direction showing a conventional motor which has been disclosed in Japanese Unexamined Patent Publication No. 254050/1986, and FIG. 8 is a sectional diagram taken along the line VIII—VIII of FIG. 7.

In FIGS. 7 and 8, numeral 1 designates a stator core which is supported in a stator frame 2, and which is wound with a coil 3 by, for instance, random winding. Numeral 4 designates a rotor, and numeral 5 designates a rotating shaft of the rotor 4, which is supported by brackets 7 through bearings 6. Numeral 8 designates a slot formed in the stator core 1, wherein the coil 3 is accommodated through a U-shaped slot insulation 9 and the departure of the coil from the slot is prevented by a wedge for slot 10.

Next, an explanation will be given of the operation. The rotor 4 and the rotating shaft 5 are rotated by an electromagnetic force which is generated by supplying power to the coil 3.

Since the conventional motor is constructed as above, when an alternating current flows in the coil 3, the stator core 1 and the coil 3 are excited to vibrate by an electromagnetic force operating between the stator core 1 and the rotor 4 and an electromagnetic force generated in the coil 3, whereby a magnetic noise is generated.

As a method of reducing the magnetic noise, there are a method of reducing the electromagnetic forces each of which is an exciting force, a method of increasing a rigidity of an excited portion (mainly stator core 1) and the like. There is a problem of a reduction in capacity in the former method and there is a problem of an increase in weight and an enlargement in physical construction in the latter method.

SUMMARY OF THE INVENTION

It is an object of the present invention to resolve such problems and to provide a stator of a vehicular alternating current generator capable of reducing a magnetic noise without reducing a power generating capacity and without increasing the weight and enlarging the physical construction.

Further, it is an object of the present invention to provide a method of manufacturing a stator of a vehicular alternating current generator capable of easily manufacturing such a stator.

According to an aspect of the present invention, there is provided a stator of a vehicular alternating current generator comprising:

a stator core having slots; and a stator coil wound in the slots of the stator core;

wherein a resin having a peak or peaks of a loss tangent which is a value of a loss elastic modulus divided by a storage elastic modulus in a temperature range of from 100° C. to 250° C. is provided among coil strands of the stator coil and/or between the stator core and the stator coil.

According to another aspect of the present invention there is provided a method of manufacturing a stator of a vehicular alternating current generator comprising the steps of:

previously coating a resin having a peak or peaks of a loss tangent in a temperature range of from 100° C. to 250° C. onto coil strands of a stator coil of a stator comprising a stator core having slots and the stator coil; and winding the coil strands of the stator coil in the slots of the stator core.

In this invention, a resin having a peak or peaks of a loss tangent in a temperature range of from 100° C. to 250° C., is provided among coil strands of a stator coil which are wound in slots of a stator core and/or between the stator core and the stator coil. Therefore, the vibrations of the stator core and the stator coil are absorbed by the resin, particularly by its viscosity, thereby promoting the attenuation of vibration at the excited portion.

Further, in this invention, after previously coating a resin having a peak or peaks of a loss tangent in a temperature range of from 100° C. to 250° C. onto coil strands of a stator coil, the coil strands are wound in slots of a stator core. Therefore, a stator core including the resin among the coil strands of the stator coil can easily be manufactured.

DETAILED DESCRIPTION OF THE PREFERRED EMBODIMENTS

EXAMPLE 1

Figure 1:
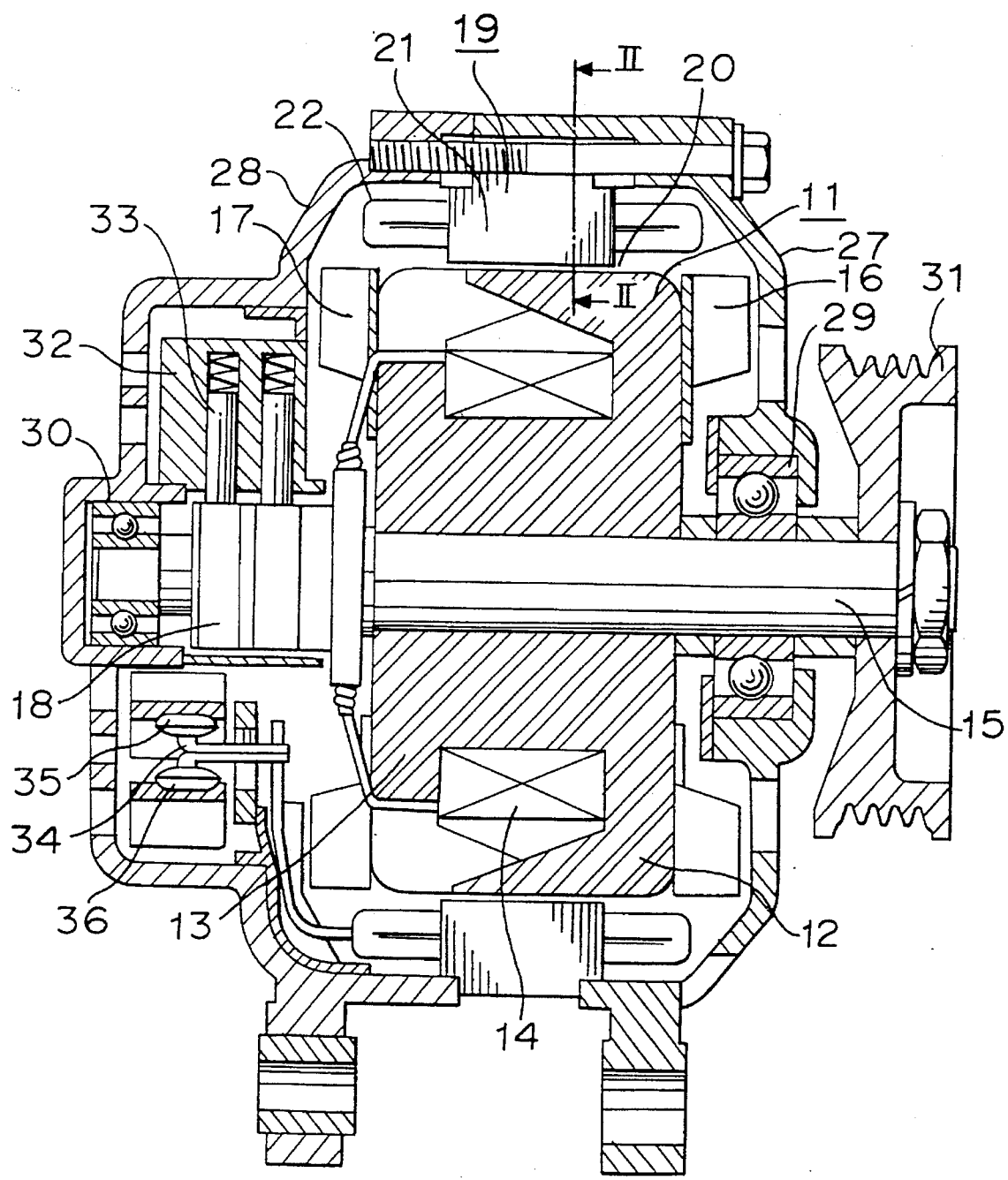
FIG. 1 is a sectional diagram in the axial direction showing an embodiment of a vehicular alternating current generator according to the present invention.

An explanation will be given of an embodiment of this invention in reference to FIGS. 1 and 2. FIG. 1 is a sectional diagram in the axial direction showing a vehicular alternating current generator, and FIG. 2 is a sectional diagram taken along the line II—II of FIG. 1.

Figure 2:
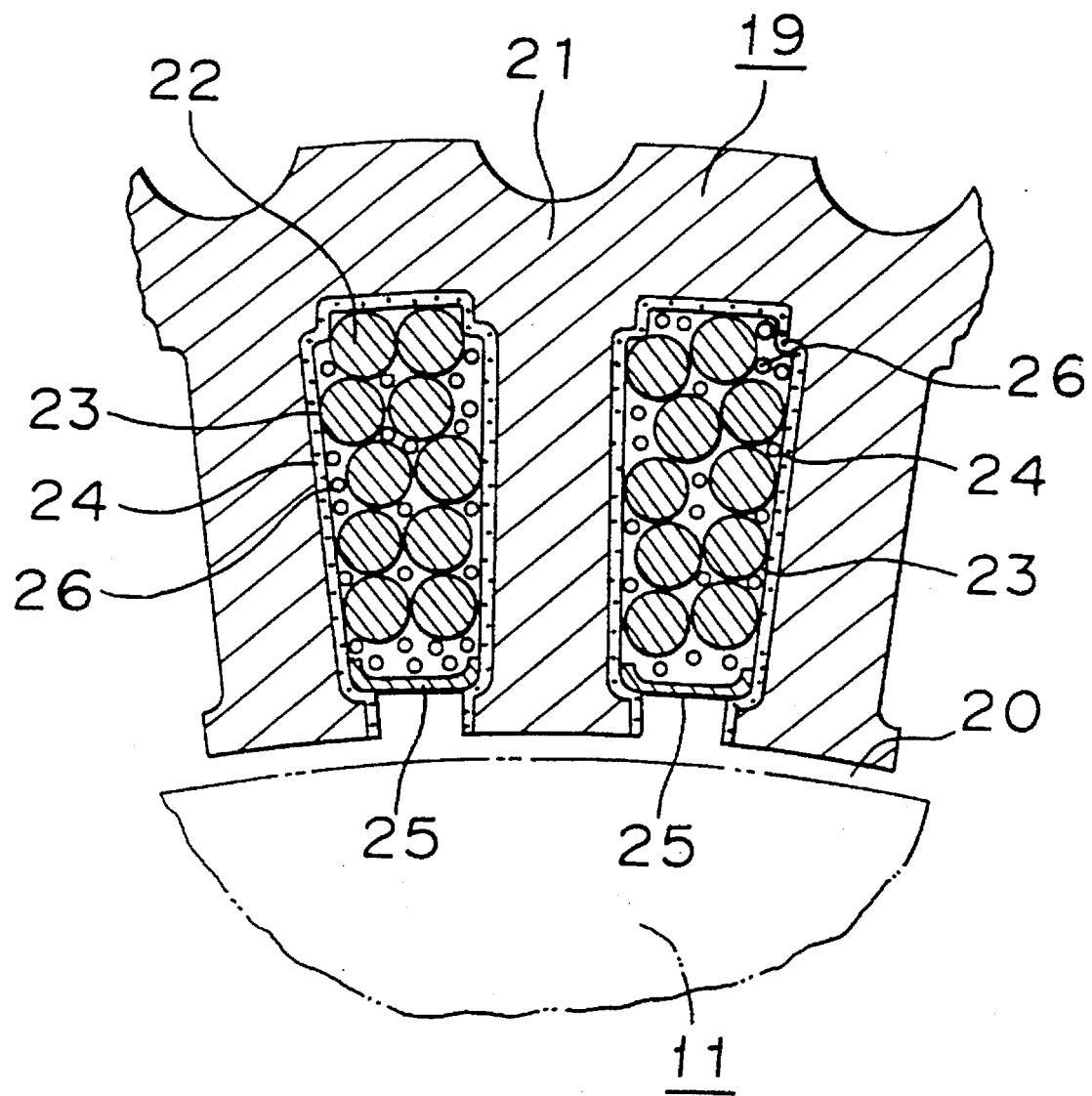
FIG. 2 is a sectional diagram taken along the line II—II of FIG. 1.

In FIGS. 1 and 2, numeral 11 designates a rotor, which is composed of a couple of mutually opposing field cores 12 and 13, a field coil 14 which is arranged inside of the field cores 12 and 13, a rotating shaft 15 which is fixed to the field cores 12 and 13, cooling fins 16 and 17 which are fixed respectively to a front end face and a rear end face of the field cores 12 and 13 with respect to their axial direction, and slip rings 18 for supplying a field current to the field coil 14.

Numeral 19 designates a stator, which is composed of a stator core 21 opposing the rotor 11 in the radial direction through an air gap 20, and a stator coil 22 that generates electric power. Numeral 23 designates a slot formed in the stator core 21, numeral 24 designates an insulating means that is fixed to an inner peripheral face of the slot 23, numeral 25 designates a blocking means for blocking an opening of the slot 23, and numeral 26 designates a resin which is provided among coil strands of the stator coil 22 that is wound around in the slot 23, and which has a peak of a loss tangent (loss elastic modulus/storage elastic modulus) in a temperature range of from 100° C. to 250° C.

Numeral 27 designates a front bracket, numeral 28 designates a rear bracket, numerals 29 and 30 designate bearings which are fixed to the both brackets 27 and 28 for supporting the rotor 11, numeral 31 designates a pulley for transmitting a rotating force from a vehicular prime mover to the rotor 11, numeral 32 designates a brush holder for holding brushes 33, and numeral 34 designates a rectifier having a positive diode and a negative diode 35 and 36.

As stated above, the resin 26 which is employed in this embodiment, is provided with a peak of a loss tangent in a temperature range of from 100° C. to 250° C.

Figure 3:
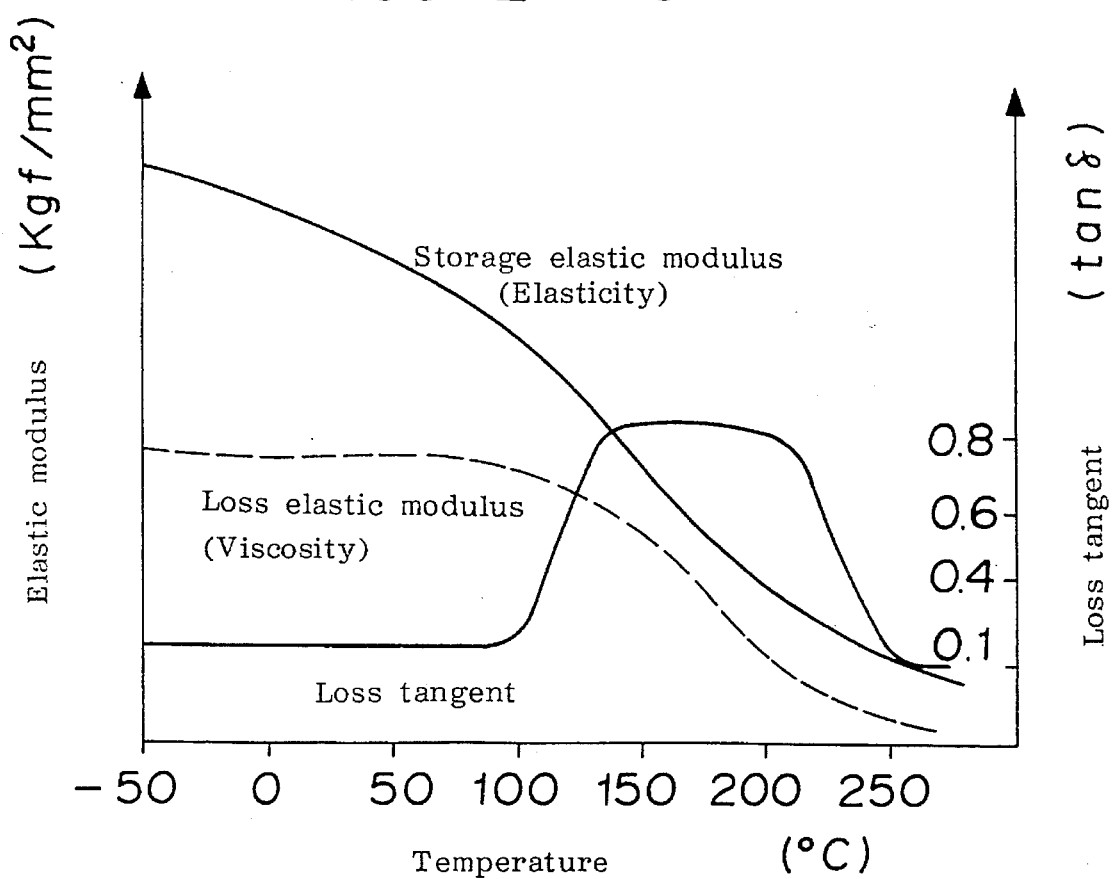
FIG. 3 is a diagram showing a viscoelastic characteristic of a denatured epoxy resin.

As shown in FIG. 3, as a characteristic of the resin 26, there are relationships (viscoelastic temperature dispersion) between a temperature of resin, and a storage elastic modulus, a loss elastic modulus and a loss tangent (loss elastic modulus/storage elastic modulus).

The object of the present invention can approximately achieved by promoting a vibration absorbing characteristic by the viscosity of the resin, at a temperature of the stator coil in a state wherein a vehicular alternating current generator is practically used.

In an actual vehicle, the magnetic noise is particularly problematic in a temperature of the stator under the state of practical use, which is approximately from 100° C. to 250° C. in consideration of an environment temperature in an engine room and an electric load. In this temperature range, the effect of reducing a noise is promoted by selecting a resin having a large loss tangent (tangent δ).

Accordingly, when the temperature of resin whereby a peak of the loss tangent is present as in this example, is restricted to a range of from 100 ° C. to 250° C., the temperature agrees with a temperature (100° C. to 250° C.) of the stator wherein the magnetic noise is particularly problematic. Therefore, the resin is effective.

Figure 4:
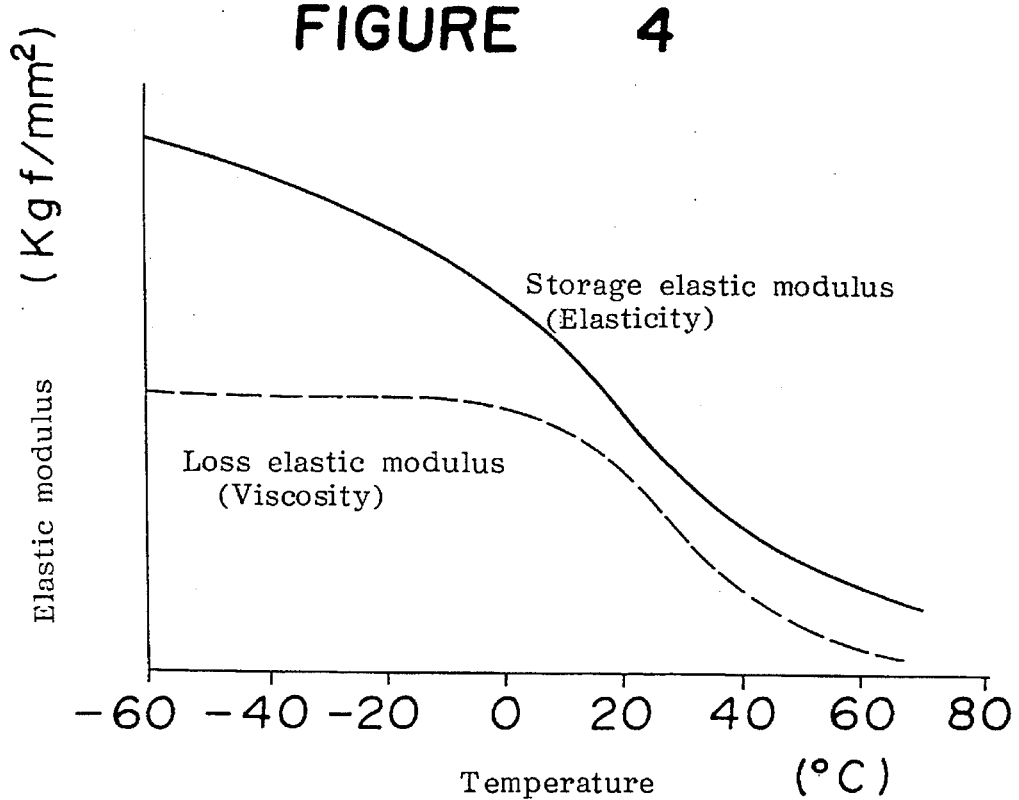
FIG. 4 is a characteristic diagram of a resin for a stator.

The above resin 26 is made of, for instance, a denatured epoxy resin. This denatured epoxy resin enters among coil strands of the stator coil 22 and fills air layers among the coil strands of the stator coil 20. Therefore, when, for instance, as the denatured epoxy resin, a resin (the characteristic diagram of a viscoelasticity of the resin is shown in FIG. 4) having a transition point in the temperature characteristic of a viscoelasticity in a temperature range of approximately from 0° C. to 60° C., is employed, a hard-to-soft transition point (glass transition point) of the viscoelasticity is at around a normal temperature. Accordingly,in a state wherein the resin enters among the coil strands of the stator coil 22, a resonance of the stator coil 21 and the coil strands of the stator coil 22 is restrained by a damping action of the viscoelasticity of this denatured epoxy resin, thereby reducing the electromagnetic sound.

Next, an explanation will be given of the operation.

When the rotor 11 is rotated by supplying a field current to the field coil 14, a magnetic circuit of from the field core 12 (N-pole) to the air gap 20, to the stator core 21, to the air gap 20 and to the field core 13 (S-pole), is constructed between the rotor 11 and the stator 19, an alternating magnetic field is formed wherein a direction and a size of magnetic flux change in accordance with the rotation of the rotor 11, and an alternating current power is generated at the stator coil 22.

An electromagnetic force is generated by the alternating magnetic field and an alternating current flowing in the stator coil 22, as an interaction of the generated magnetic field, which operates on the stator core 21 and the stator coil 22 as an exciting force, thereby causing the magnetic noise. However, since the resin 26 provided among the coil strands of the stator coil 22, particularly its viscosity. absorbs the vibrations of the stator core 21 and the stator coil 22, thereby promoting the attenuation of vibration at the excited portion.

Figure 5:
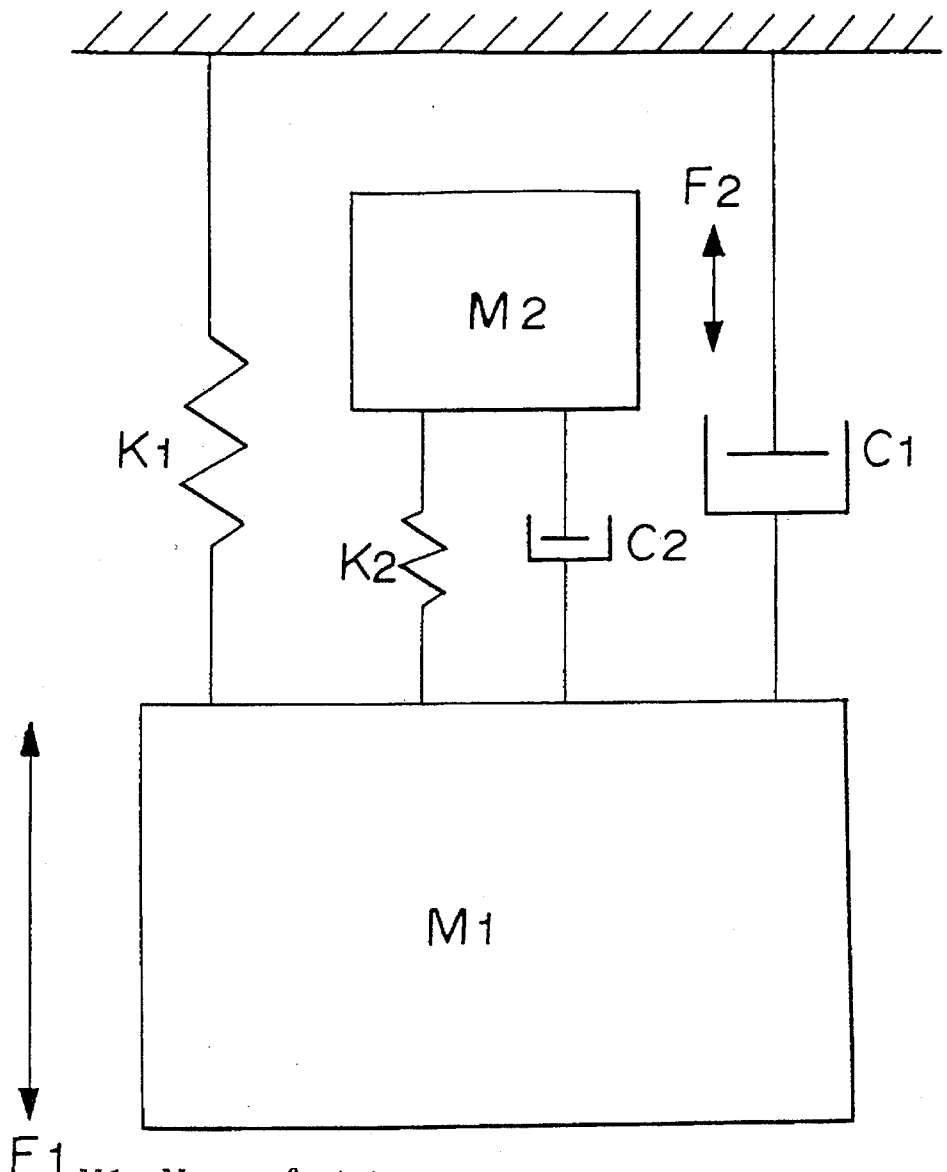
FIG. 5 is a diagram of a model showing vibration of a stator in FIG. 1.

Next, a detailed explanation will be given of the vibration of the stator 19 in reference to a model shown in FIG. 5. The stator core 21 and the stator coil 22 are excited to vibrate by an electromagnetic-force $F_1$ operating between the stator 19 and the rotor 11 and an electromagnetic force $F_2$ generated at the stator coil 22, whereby the magnetic noise is generated. At this occasion, particularly when the frequencies of the electromagnetic forces $F_1$ and $F_2$ agree with the natural frequencies of the stator core 21 and the stator coil 22, a resonance phenomenon is caused, and offensive peak sounds are generated as shown by the dotted line in FIG. 6.

However, when the resin 16 is present among the coil strands of the stator coil 22, the resin 26, particularly its viscosity absorbs the above vibrations and promotes the attenuation of vibration at the excited portion.

Figure 6:
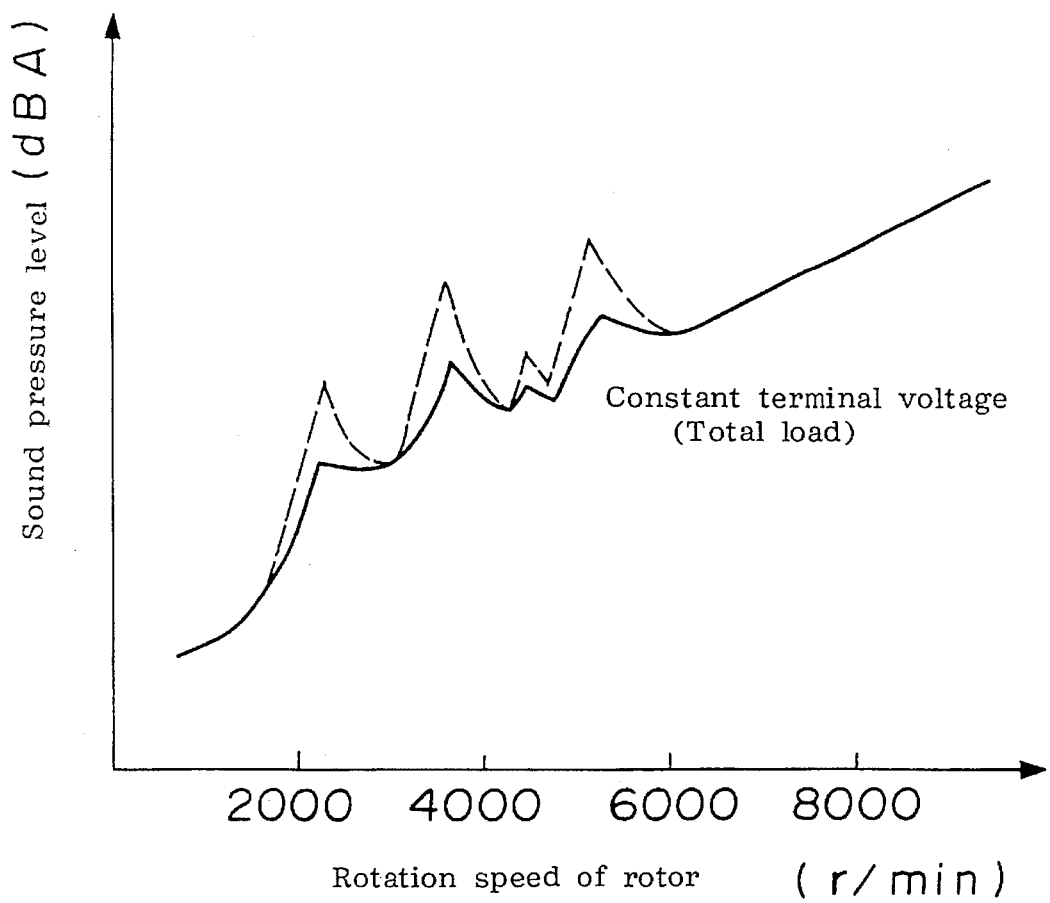
FIG. 6 designates graphs showing an effect of attenuating a magnetic sound.
Figure 7:
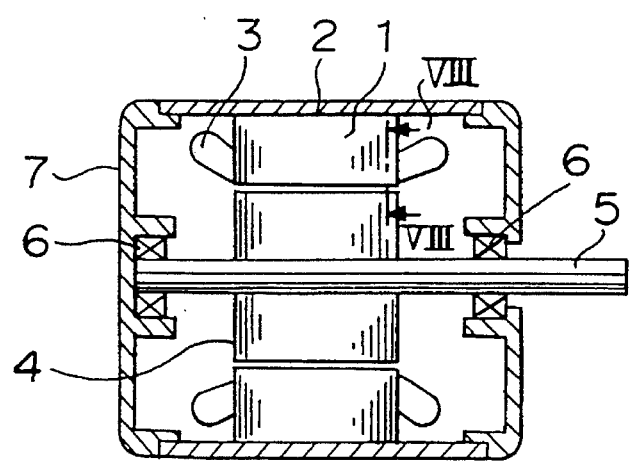
FIG. 7 is a sectional diagram in the axial direction showing a conventional motor.
Figure 8:
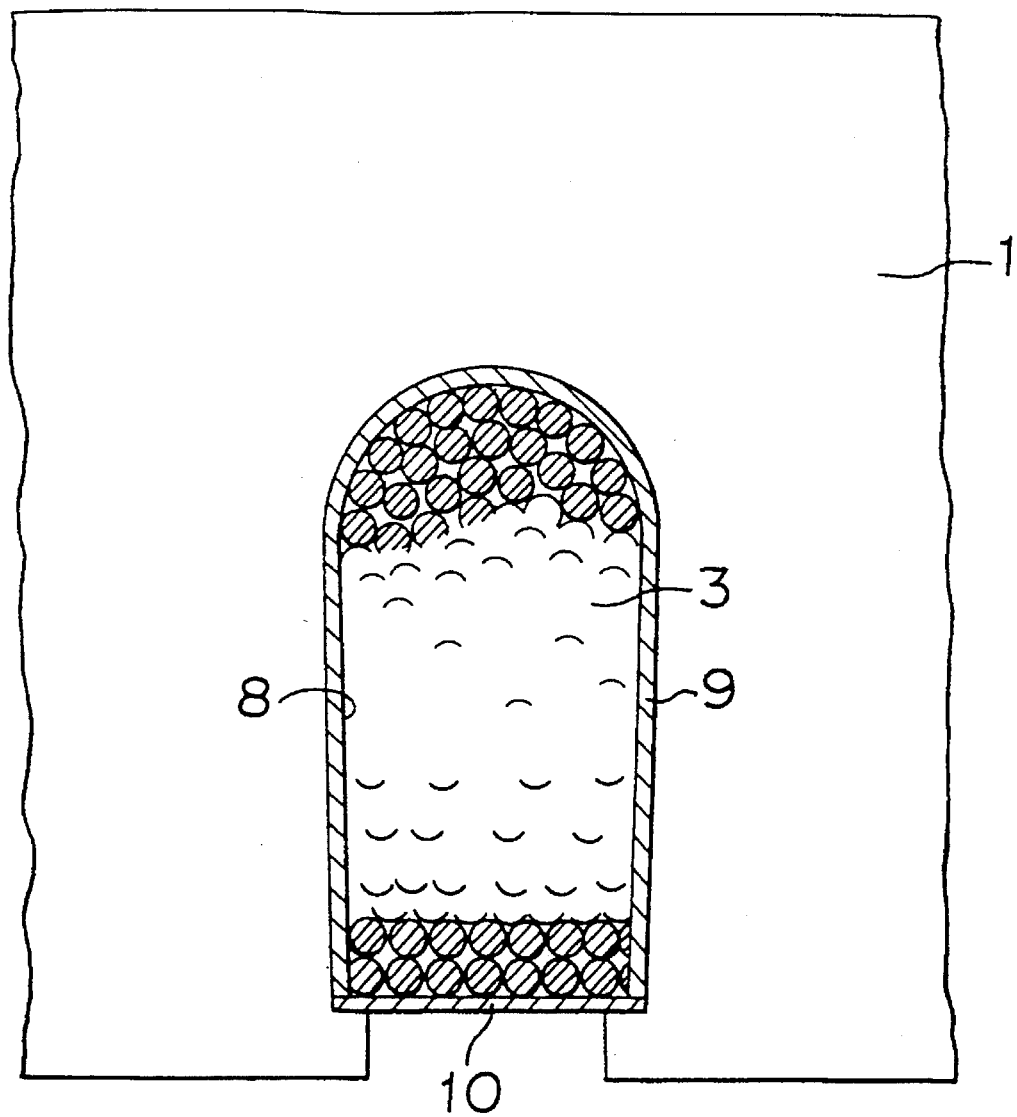
FIG. 8 is a sectional diagram taken along the line VIII—VIII of FIG. 7.

As a result, the sound pressure level of the magnetic noise is totally reduced as shown by the bold line in FIG. 6, and the sound pressure levels of peaks that are caused by the above-mentioned resonance phenomenon, can be reduced.

As a resin in this example, a flexible resin blended with polyester and polyurethane, a flexible resin blended with polyester and silicone resin, a flexible resin blended with polyester and a denatured epoxy resin, a flexible resin whose major component is polyurethane, a flexible resin whose major component is silicone resin, a flexible resin whose major component is a denatured epoxy resin and the like are pointed out.

Further, a plurality of peaks of the loss tangent may be provided to the resin of this example.

EXAMPLE 2

In the above example 1, the resin 26 is arranged among the coil strands of the stator coil 22. However, the resin 26 may be provided between the stator core 21 and the stator coil 22. Also in this case, an effect is provided wherein the resin 26, particularly its viscosity absorbs the vibrations of the stator core 21 and the stator coil 22, thereby promoting the attenuation of vibration at the excited portion.

Further, when the resin 26 is arranged among the coil strands of the stator coil 22 and between the stator core 21 and the stator coil 22, the vibrations of the stator core 21 and the stator coil 22 can naturally be absorbed further.

EXAMPLE 3

As is apparent from the graphs of the viscoelastic characteristic of the resin 26 shown in FIG. 3, when the peak value of the loss tangent of the resin 26 in the above Examples 1 and 2, is not smaller than 0.6, an especially excellent damping action is provided, thereby achieving a great effect.

EXAMPLE 4

When the loss tangent of the resin 26 in the above examples 1 and 2, is not smaller than 0.1 in a temperature range of from 20° C. to 250° C., an especially excellent damping action is provided in a temperature range of the stator coil 22 under the state of practical use. Therefore, the resin is effective.

EXAMPLE 5

Next, an explanation will be given of a method of manufacturing the stator 19 in reference to FIG. 2. The resin 26 is previously coated on the coil strands of the stator coil 22 before winding the stator coil 22. The coil strands of the stator coil 22 that are coated with the resin 26, are wound around in the slots 23 of the stator core 21.

In this way, the stator 19 wherein the resin 26 is provided among the coil strands of the stator coil 22 can easily be manufactured.

EXAMPLE 6

Further, as another manufacturing method, the stator 19 may be manufactured by impregnating the resin 26 among the coil strands of the stator 22 by a vacuum impregnation, after winding the stator coil 22 in the slots 23 of the stator core 21. The stator 19 wherein the resin 26 is provided among the coil strands of the stator coil 22 can similarly and easily be manufactured.

Further, the resin 26 may be impregnated between the stator core 21 and the stator coil 22, or between the stator core 21 and the stator coil 22 and among the coil strands of the stator coil 22.

As stated above, according to the aspect of the present invention, an effect is achieved wherein a magnetic noise can be reduced without lowering the power generating capacity or without increasing the weight and enlarging the physical structure.

According to another aspect of the present invention, a great effect is achieved by providing an especially excellent damping action through rendering the loss tangent of a resin not smaller than 0.6.

According to another aspect of the present invention, an effect is achieved by providing an especially excellent damping in a temperature range of the stator coil under the state of practical use wherein the loss tangent of a resin in a temperature range of from 20° C. to 250° C. is not smaller than 0.1.

According to another aspect of the present invention, an effect is achieved wherein such a stator can easily be manufactured.

What is claimed is:

1. A stator of a vehicular alternating current generator comprising:

a stator core having slots;

a stator coil wound in the slots of the stator core; and a resin having a peak or peaks of a loss tangent, which is a value of a loss elastic modulus divided by a storage elastic modulus in a temperature range of from 100° C. to 250° C. disposed among coil strands of the stator coil and/or between the stator core and the stator coil.

2. The stator of a vehicular alternating current generator according to claim 1, wherein the peak or peaks of the loss tangent of the resin are not smaller than 0.6.

3. The stator of a vehicular alternating current generator according to claim 1, wherein the loss tangent of the resin is not smaller than 0.1 in a temperature range of from 20° C. to 250° C.

4. A method of manufacturing a stator of a vehicular alternating current generator comprising the steps of:

previously coating a resin having a peak or peaks of a loss tangent in a temperature range of from 100° C. to 250° C. onto coil strands of a stator coil of a stator comprising a stator core having slots and the stator coil; and winding the coil strands of the stator coil in the slots of the stator core.

5. A method of manufacturing a stator of a vehicular alternating current generator wherein the stator is comprising a stator core having slots and a stator coil, said method comprising the steps of:

winding coil strands of the stator coil in the slots of the stator core; and impregnating a resin having a peak or peaks of a loss tangent in a temperature range of from 100° C. to 250° C. among the coil strands of the stator coil and/or between the stator core and the stator coil.

\* \* \* \* \*